March 23, 1926.

G. MATZ

ENGINE

Filed May 26, 1925

1,578,199

INVENTOR
George Matz
BY
Marshall & Hawley
ATTORNEYS

Patented Mar. 23, 1926.

1,578,199

UNITED STATES PATENT OFFICE.

GEORGE MATZ, OF NEW YORK, N. Y.

ENGINE.

Application filed May 26, 1925. Serial No. 32,881.

*To all whom it may concern:*

Be it known that I, GEORGE MATZ, a citizen of Russia, and a resident of New York city, Bronx County, and State of New York, United States of America, have invented certain new and useful Improvements in Engines, of which the following is a specification.

This invention relates to engines.

The invention has for its salient object to provide an engine and valve mechanism therefor that is similar and practical in construction, comprises few parts and will be efficient in operation.

Another object of the invention is to provide an engine in which the valve mechanism is carried by and movable with the piston.

Figure 1:
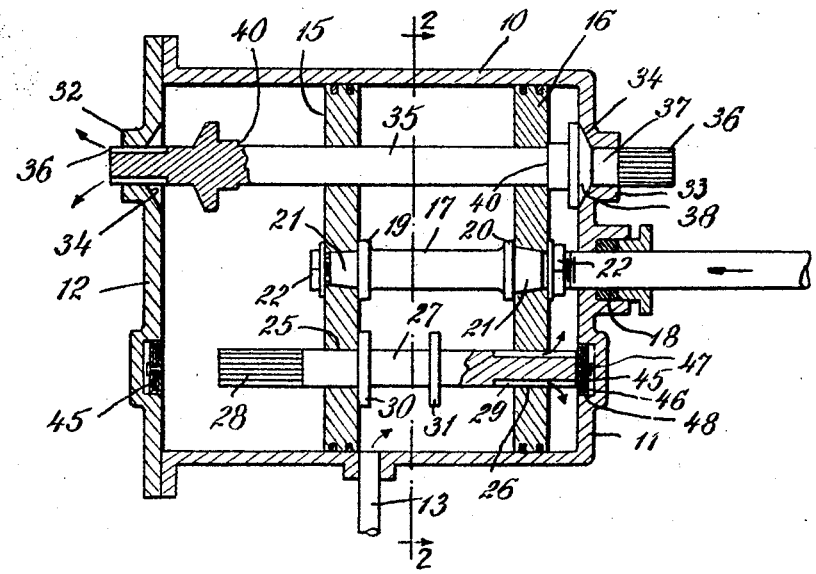

Further objects of the invention will appear from the following specification taken in connection with the drawings which form a part of this application, and in which Fig. 1 is a sectional elevation of an engine constructed in accordance with the invention.

Figure 2:
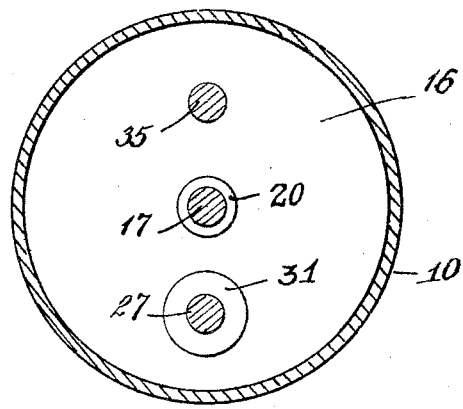
Figure 3:
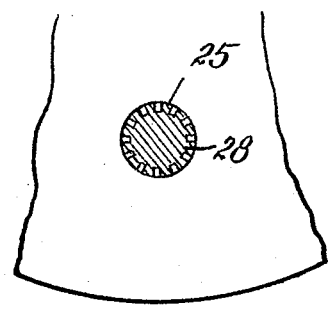

Fig. 2 is a transverse sectional elevation of the construction shown in Fig. 1, and Fig. 3 is a fragmentary view showing in section the grooved portion of one of the valves.

The invention briefly described comprises a cylinder, a piston within the cylinder comprising a pair of disks secured to a piston rod in spaced relation. The cylinder has an inlet port intermediate the ends thereof for admitting motive fluid, such as steam, to the cylinder and this motive fluid is admitted to the cylinder between the piston disks which form the heads of the piston. The motive fluid is admitted from the space between the piston disks into the two ends of the cylinder by means of valves slidably mounted in the piston and adapted to engage the ends or heads of the cylinder. An exhaust port is provided at each end of the cylinder and the passage of the motive fluid through these ports is controlled by valves also carried by and movable with the piston. Further details of the invention will appear from the following description.

It will be understood that as many cylinders as desired may be utilized in the engine, but in the embodiment of the invention shown a single cylinder is illustrated. This cylinder comprises the usual cylindrical body portions 10, closed at its ends by cylindrical heads 11 and 12. An inlet port 13 communicates with the cylinder intermediate the ends thereof, this port always remaining open.

A piston is mounted in the cylinder and comprises a pair of disks or heads 15 and 16 secured in spaced relation to a piston rod 17 which extends through a stuffing box 18 on the cylindrical head 11. In the form of the invention shown, the piston disks 15 and 16 are secured against collars 19 and 20 formed on the piston rod, the disks being held in place on conical seats 21 by nuts 22.

The disks 15 and 16 are provided with alined openings 25 and 26 which receive a valve stem 27 having longitudinally grooved end portions 28 and 29. Stop collars 30 and 31 are carried by the valve stem 27 for limiting the movement of the valve stem through the openings 25 and 26.

The ends of the valve stem 27 are adapted to engage the cylindrical heads 11 and 12 as the piston moves from one end of the cylinder to the other and the engagement of the ends of the valve stem with the cylindrical heads causes the valve stem to move longitudinally in the piston heads, thus automatically opening and closing the passages 25 and 26 through the piston heads.

In order to absorb the shock of the impact of the ends of the valve with the cylindrical heads 11 and 12, these heads are provided with cushions or shock absorbing devices disposed in alinement with the valve stem. These devices may be of any desired form or shape and in the particular form illustrated each device comprises a plurality of washers 45 disposed in a recess 46 in the end of the cylinder. These washers may be formed of asbestos or any other desired material adapted to cushion the impact of the valve. The washers 45 may, if desired, be mounted on a spindle 47 which is slidably supported in a cage 48.

It will be noted that the disks 15 and 16 are spaced apart a distance corresponding substantially to the length of stroke of the piston so that the inlet port 13 always communicates with the space between the piston disks or heads. With the parts in the position shown, steam or other motive fluid is being admitted to the right hand end of the cylinder and will continue to be admitted to this end of the cylinder until the end 28 of the valve engages the cylindrical head 12, whereupon the grooved portion 29 of the valve stem will be forced through the disk 16 and the central portion of the valve stem which is cylindrical will stop the passage of fluid to the right hand end of the cylinder. At the same time the grooved portion 28 will be positioned within the opening 25, thus permitting the passage of fluid to the left hand end of the cylinder.

An exhaust port is provided in each of the cylinder heads, these ports in the heads 11 and 12 being indicated as 32 and 33. The ports 32 and 33 are cylindrical and communicate with conical seats 34 at their inner ends. The exhaust ports are controlled by a valve stem or rod 35 having a valve formed on each end thereof. Each valve consists of a grooved outer portion 36, a cylindrical intermediate portion 37, and a conical portion 38.

With the parts of the engine in the position illustrated, the exhaust port 32 is open, and therefore the left hand portion of the cylinder communicates by means of the grooves 36 with the atmosphere. The valve at the right hand end of the valve stem or rod is closed and the cylindrical portion 37 thereof registers with the cylindrical port 33 and the conical portion 38 of the valve registers with the conical seat 34. When the piston has moved to the left a sufficient distance, the disk 15 will engage a collar 40 and close the left hand valve and move the valve stem or rod to the left, thus opening the right hand exhaust valve.

It will of course be understood that in manufacturing the engine above described the nut 22 can be countersunk in the piston head 16 and the exhaust valve can seat in the cylinder head so that the clearance space will be reduced to a minimum.

From the foregoing description it will be seen that the piston will be alternately moved from one end to the other of the cylinder, the inlet and exhaust valves being actuated by the movement of the piston, no extraneous valve shafts or other complicated connecting parts being necessary.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. An engine comprising a cylinder, a piston comprising a pair of spaced disks, an intake port in the cylinder intermediate the ends thereof and adapted to admit motive fluid to the cylinder intermediate the piston disks, exhaust ports in said cylinder, a valve carried by the piston disks and movable with and relatively to the piston for controlling the admission of the motive fluid from the space between the piston disks to the ends of the cylinder, a valve stem carried by the piston and valves at the ends of said stem for controlling the exhaust ports.

2. An engine comprising a cylinder, a piston therein comprising two heads spaced apart, an inlet port located intermediate the ends of the cylinder and adapted to admit motive fluid to the space between the piston heads in all positions of movement of the piston, a valve slidably mounted in the piston and having longitudinal grooves adjacent each end thereof adapted to establish communication between the space between the piston heads and the two ends of the cylinder and a valve stem carried by said piston and having grooves at the ends thereof adapted to permit the exhaust of the fluid from the ends of the cylinder.

3. An engine comprising a cylinder, a piston therein comprising two heads spaced apart, an inlet port located intermediate the ends of the cylinder and adapted to admit motive fluid to the space between the piston heads in all positions of movement of the piston, a valve slidably mounted in the piston and adapted to establish communication between the space between the piston heads and the two ends of the cylinder, the ends of said valve being engageable with the cylinder heads, exhaust ports in said cylinder heads and a valve rod carried by said piston and having at its ends valves adapted to coact with and control said exhaust ports.

4. An engine comprising a cylinder, a piston therein, means including the piston for admitting motive fluid to the cylinder, an exhaust port at one end of the cylinder having a cylindrical wall and a conical seat, a valve having a grooved portion at one end for permitting the passage of the motive fluid through the exhaust port, a cylindrical portion at one end of the grooved portion for closing said port and having a conical portion at the other end of the cylindrical portion adapted to seat on the conical seat of the exhaust port.

5. An engine comprising a cylinder, a piston therein, means for admitting motive fluid to the cylinder, an exhaust port at one end of the cylinder having a cylindrical wall and a conical seat, a valve having a grooved portion at one end for permitting the passage of the motive fluid through the exhaust port, a cylindrical portion at one end of the grooved portion for closing said port and having a conical portion at the other end of the cylindrical portion adapted to seat on the conical seat of the exhaust port.

6. An engine comprising a cylinder, a piston therein, means including the piston for admitting motive fluid to the cylinder, an exhaust port at each end of the cylinder having a cylindrical wall and a conical seat, a valve for each exhaust port having a grooved portion at one end for permitting the passage of the motive fluid through the exhaust port, a cylindrical portion at one end of the grooved portion for closing said port and having a conical portion at the other end of the cylindrical portion adapted to seat on the conical seat of the exhaust port.

7. An engine comprising a cylinder, a piston therein, means including the piston for admitting motive fluid to the cylinder, an exhaust port at each end of the cylinder having a cylindrical wall and a conical seat, a piston controlled valve for each exhaust port having a grooved portion at one end for permitting the passage of the motive fluid through the exhaust port, a cylindrical portion at one end of the grooved portion for closing said port and having a conical portion at the other end of the cylindrical portion adapted to seat on the conical seat of the exhaust port.

In witness whereof, I have hereunto set my hand this 25th day of May, 1925.

GEORGE MATZ.